United States Patent [19]

Yale et al.

[11] Patent Number: 4,624,861

[45] Date of Patent: Nov. 25, 1986

[54] RARE EARTH OXYSULFIDE PHOSPHORS AND PROCESSES FOR CREATING SAME

[75] Inventors: Ramon L. Yale, Ulster; Nelson W. Shearer, Towanda, both of Pa.

[73] Assignee: GTE Products Corporation, Stamford, Conn.

[21] Appl. No.: 772,811

[22] Filed: Sep. 5, 1985

[51] Int. Cl.$^4$ .................... B05D 5/06; B05D 5/12; B05D 7/00; C09K 11/08

[52] U.S. Cl. .......................... 427/65; 252/301.45; 427/68; 427/215

[58] Field of Search .................... 252/301.65, 301.45; 427/157, 158, 215, 65, 68; 428/403

[56] References Cited

U.S. PATENT DOCUMENTS 3,825,436 7/1974 Buchanan et al. .................. 427/157
4,513,024 4/1985 Morita et al. .......................... 427/65

Primary Examiner—Michael R. Lusignan
Attorney, Agent, or Firm—Donald R. Castle; L. Rita Quatrini

[57] ABSTRACT

Rare earth oxysulfide phosphors and processes for creating the phosphors are disclosed.

One process involves wet milling a material comprising a rare earth oxysulfide, removing soluble impurities, drying, forming a relatively uniform admixture comprising the dried material and aluminum oxide with the aluminum oxide content being from about 0.1 to about 1.0 weight percent of the admixture, followed by heating the admixture at a sufficient temperature for a sufficient time to form the phosphor.

Another process involves the wet milling, soluble impurity removal and drying steps described above. The dried material is then dry milled without aluminum oxide, and heated as described above.

Another process involves the wet milling, soluble impurity removal, drying, dry milling, and heating steps described above except that the material is dry milled with from about 0.1 to about 1.0 weight percent of aluminum oxide.

19 Claims, No Drawings

RARE EARTH OXYSULFIDE PHOSPHORS AND PROCESSES FOR CREATING SAME

BACKGROUND OF THE INVENTION

This invention relates to a process for creating rare earth oxysulfide phosphors which involves milling techniques which result in essentially a non-agglomerated free flowing phosphor.

Rare earth oxysulfide phosphors have become successful x-ray intensifier phosphors. In this application the phosphor is on a screen called an intensifier screen. The screen is mounted in a cassette where in operation the phosphor thereon is exposed to x-rays. The phosphor converts the x-rays into visible or near visible radiation to which a photosensitive film is exposed resulting in an image being produced on the film.

Recent demands on the x-ray intensifier screen industry have led to the desirability of a non-agglomerated, free flowing phosphor that can be easily mixed with binder systems without extensive milling or similar processing.

SUMMARY OF THE INVENTION

This invention provides rare earth oxysulfide phosphors and processes for creating these phosphors.

One process involves wet milling a material comprising a rare earth oxysulfide, removing soluble impurities, and drying the material. A relatively uniform admixture is then formed comprising the dried material and aluminum oxide with the aluminum oxide content being from about 0.1 to about 1.0 weight percent of the admixture. The admixture is heated at a sufficient temperature for a sufficient time to form the phosphor.

Another process involves the wet milling, soluble impurity removal, and drying steps described above, followed by dry milling the resulting dried material with no aluminum oxide, and heating the dry milled material as described above.

Another process invoves the wet milling, soluble impurity removal, and drying steps described above, followed by dry milling a mixture comprising the dried material and aluminum oxide with the aluminum oxide content being from about 0.1 to about 1.0 weight percent of the mixture. The resulting dry milled material is then heated as described previously.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The rare earth oxysulfide phosphors produced by the process of this invention are primarily gadolinium, yttrium, lanthanum, or mixtures thereof, and solid solution combinations of these as hosts. Other hosts can be lutetium and scandium. The phosphors are primarily terbium activated. Other activators can be erbium, holmium, thulium, and europium provided a film system is available to match the phosphor emission. The especially preferred phosphors produced by the process of this invention are terbium activated gadolinium oxysulfide and terbium activated lanthanum oxysulfide.

Typically, a material comprising a rare earth oxysulfide, for example, gadolinium oxysulfide, and an element, for example, terbium, as as activator in the final phosphor, are crushed to about 1 centimeter pieces and wet milled. The wet milling has several advantages. First of all, the wet milling accomplishes some deagglomeration, while at the same time by the deagglomeration, it serves to improve the solubilization of the impurities such as polysulfides which are present in the material as a result of the systhesis of the rare earth oxysulfide.

If the impurities are allowed to remain on the material, the brightness of the subsequently produced phosphor decreases. Furthermore, by the caustic nature of the polysulfide impurities, there is a deterioration of the x-ray screen in the application. The presence of the polysulfide during the wet milling operation decreases the friction between the rare earth oxysulfide particles and deagglomeration is accomplished essentially without breaking the crystal structure of the rare earth oxysulfide which would subsequently result in decreased brightness of the phosphor. Therefore, the presence of the polysulfides during the wet milling operation is an advantage.

The wet milling operation can be done by any standard technique for milling an aqueous slurry. One such technique is to introduce the material into a container with milling media which is preferably about $\frac{3}{8}$ inch diameter aluminum oxide balls and water. The container is filled to about $\frac{1}{2}$ of its volume with the milling media. For example with a 1 liter container, about 500 cc of milling media are introduced with about 400 g of the phosphor. The water is introduced into the container in a volume equal to about $\frac{1}{4}$ the volume of the container, so that for a 1 liter container about 250 cc of water are introduced. The container with the contents is then placed on a rolling mill and rolled for a period of time determined by the hardness of the material being milled.

The milling media is then removed from the material. The usual procedure is by placing the contents of the container on a screen or sieve and washing the material off the milling media. The water is preferably hot deionized water and this washing serves to remove the soluble impurities which must be removed from the material for the reasons given previously. The washing is carried out until the wash water is at a pH of from about 7.5 to about 8.0 indicating that essentially all of the caustic polysulfide impurities have been removed. Usually about 14 liters of water are needed to wash about 400 g of material.

The wash solution is removed from the resulting washed material usually by decantation or filtration.

If the material is to be coated with a silicate, the separation is generally done by decantation. If the next step is drying, the separation is done by filtration. In the latter case the material is now dried usually by heating at a temperature usually no greater than about 150° C. to remove essentially all of the water from the material. The drying time depends on the amount of material.

A relatively uniform admixture is then formed comprising the dried material and aluminum oxide with the aluminum oxide content being from about 0.1 to about 1.0 weight percent and preferably from about 0.3 to about 0.5 weight percent of the admixture.

The preferred aluminum oxide is Aluminum Oxide C manufactured by Degussa of West Germany. Aluminum Oxide C is produced by flame hydrolysis of aluminum chloride. As a result of this special production process, the highly dispersed Aluminum Oxide C differs fundamentally from other aluminum oxides which are produced by precipitation, thermal decomposition, or refinement of minerals. Aluminum Oxide C is distinguished by small primary particle diameter, high chemical purity, and large specific surface area. A typical particle size analysis shows about 100% of the particles are below about 40 nanometers, about 95% of the particles are below about 20 nanometers, and about 70% are below about 10 nanometers. Aluminum Oxide C has, in addition to a slight delta structure, primarily a gamma structure. Details of x-ray studies of Aluminum Oxide C are published by Hunger and Figueroa, Z. Phys. Chem. NF 91,248 (1974). In contrast to most solid microfine materials, Aluminum Oxide C has the pronounced tendency to remain electrostatically neutral in the powder condition. When used as a dry powder, Aluminum Oxide C opposes the electrostatic charging of materials in powder form which tend to develop a charge. These special characteristics of Aluminum Oxide C improve the properties of the phosphor of this invention in particular, the handling characteristics as bulk density and sieving time. Further details on Aluminum Oxide C can be found in "Technical Bulletin Pigments" No. 56 published by Degussa.

The admixture is formed by standard powder blending techniques.

The admixture is then heated at a sufficient temperature for a sufficient time to form the rare earth oxysulfide phosphor. The heating temperature is generally from about 500° C. to about 600° C. The heating time depends on the size of the charge of the material.

The heating is done to enhance the brightness to the rare earth oxysulfide.

It has been found that coating the rare earth oxysulfide with a silicate coating, preferably magnesium silicate or zinc silicate further increases the bulk density of the phosphor. The coating step is done prior to formation of the admixture, preferably after the wet milling and washing step. After the washing of the wet milled material the wash water is removed from the material by decantation. To the resulting wet milled material is added more water is necessary to form a slurry and a source of silicon dioxide which is preferably pure potassium silicate and a water soluble salt of magnesium or zinc, preferably magnesium sulfate, or zinc chloride. The resulting mixture is agitated for a period of time, preferably about 5 minutes to form the respective coating on the material. Preferably the water soluble salt is added in an amount to give a weight ratio of from about 4 to 1 of the water soluble salt to the silicon dioxide. The silicon dioxide and the water soluble salt are added in amounts which will result in a coating which makes up at least about 0.05% by weight of the final phosphor, and most preferably from about 0.1% to about 0.3%.

The resulting coated material is then separated from the resulting liquor by any standard technique such as filtration.

The silicate coated material is then dried and further processed as described previously.

In accordance with another aspect of this invention, a material comprising a rare earth oxysulfide and an element for example terbium as an activator is subjected to the wet milling, the soluble impurity removal, and the drying steps as described previously.

The dried material is then dry milled. The dry milling can be done by any standard milling technique, for example, on a rolling type ceramic jar mill, in a wide mouth plastic bottle, or in a vibration energy mill. A preferred dry milling method is to introduce the material into a container as described for wet milling with milling media in amounts described previously for wet milling. With about 400 g of material, the milling time is generally from about 20 to about 60 minutes on a roller mill. Another dry milling method is vibration energy milling using a mill manufactured, for example, by SWECO, a division of Emerson Electric Company.

The milling media is then removed from the material. The dry milling further deagglomerates the material.

The dry milled material is then subjected to the heating step described previously to form the final phosphor.

Prior to the dry milling step and preferably after the wet milling step and washing step, the material can be coated with a silicate coating preferably magnesium silicate or zinc silicate as described previously. After the coating procedure, the material is then subjected to the drying step if necessary and the dry milling and heating steps.

In accordance with another aspect of the invention a material comprising a rare earth oxysulfide and an element for example terbium as an activator is subjected to the wet milling, soluble impurity removal, and drying steps described previously.

A mixture of the resulting dried material and aluminum oxide, preferably Aluminum Oxide C as described previously in amounts described previously is dry milled according to the previously described dry milling procedure.

The resulting dry milled material is then subjected to the heating step described previously to produce the phosphor.

Prior to the dry milling step and preferably after the wet milling step and wash step, the material can be coated with a silicate coating preferably magnesium silicate or zinc silicate as described previously. After the coating procedure the material is then subjected to the drying step if needed and the dry milling step.

The phosphors thus produced can be classified such as by passing them through the appropriate size mesh screen to remove any out of size material and to obtain the desired particle size.

The phosphors produced by the above described processes involving wet and dry milling operations exhibit improved handling characteristics as a result of the deagglomeration.

Use of aluminum oxide, in particular Aluminum Oxide C enhances the handling characteristics of the resulting phosphors.

To more fully illustrate this invention, the following nonlimiting examples are presented.

In measuring the degree of deagglomeration, the following procedure is carried out.

A sample of the phosphor is essentially fully deagglomerated or predisposed by means of a ½" diameter ultrasonic probe at about 100 watts of power for about 5 minutes. Coulter counter (agglomerate size distribution) readings are taken on a nondispersed (as is) phosphor sample and the readings are compared to determine the difference in agglomerate size between the dispersed and non-dispersed samples. The difference between the 50% micron size of the dispersed and non-dispersed samples is the reduction in agglomerate size from the as is sample to the fully dispersed sample. Therefore, the greater the reduction, the greater the degree of agglomeration that exists in the as is sample.

The same batch of terbium activated gadolinium oxysulfide is used in Examples 1, 2, and 3 for purposes of comparison.

EXAMPLE 1

About 540 g of the material is washed with no wet milling, silicate coating, or dry miling. It is then dried and heated in air for about 2 hours at about 525° C. It has a percent reduction in agglomerate size measured by the above described method of about 34.4%, and a bulk density of about 2.31 g/cc. About 120 g/min pass through a 400 mesh sieve.

EXAMPLE 2

About 1620 g of the material is wet milled, washed with deionized water, and the wash water is decanted. The material is then given a magnesium silicate coating of about 0.2%. The resulting coated material is then dried and dry milled with about 0.3% Aluminum Oxide C for about 40 minutes in a 1 liter capacity wide mouth plastic bottle with about 500 cc of about ⅜" alumina balls. After milling, the balls are removed and the material is heated for about 2 hours at about 525° C. in an air atmosphere. The resulting phosphor has a percent reduction of about 11.8%. The bulk density is about 3.09 g/cc, and about 540 g/min. pass through a 400 mesh screen. A comparison of Examples 1 and 2 shows that with wet milling and dry milling with Aluminum Oxide C as in Example 2, the phosphor has better handling characteristics. This is shown by the greater degree of deagglomeration as shown by the lesser percent reduction in agglomerate size, the greater bulk density and the improved flowability as shown by the decreased sieving time of Example 2 over Example 1.

EXAMPLE 3

About 1620 g of the material is wet milled and washed by being split into approximately equal parts which are roller milled in 1 liter capacity wide mouth plastic bottles with about 500 cc of ⅜" alumina balls and about 300 ml of cold deionized water. The resulting slurries are then combined and transferred to a 1 pint SWECO chamber and milled for about 1.5 hours on a SWECO mill. The material is then repeatedly washed to a conductivity of less than about 104 μho. It is then given a 0.2% magnesium silicate coating, filtered, and dried. To the dry material about 0.3% Aluminum Oxide C is added and the resulting mixture is blended in a 1 gallon capacity plastic jug on a shaker. The material is then heat treated for about 2 hours at about 525° C. in an air atmosphere, cooled, and sieved through a 400 mesh screen. The resulting phosphor has about an 8% agglomerate size reduction, a bulk density of about 2.93 g/cc, and about 63 g/min. pass through a 400 mesh screen.

Example 3 shows that with wet milling and blending with Aluminum Oxide C, the handling characteristics are improved over Example 1.

Another batch of terbium activated gadolinium oxysulfide is used in Examples 4, 5, and 6 for purposes of comparison.

EXAMPLE 4

About 378 g of the material which has been wet milled and given about a 0.2% magnesium silicate coating and dried is charged to a 1 liter capacity wide mouth plastic bottle with about 500 cc of ⅜" diameter alumina balls and dry milled for about 40 minutes. The balls are removed and the material is heat treated in air for about 2 hours at about 525° C. The resulting phosphor is then sieved through a 400 mesh screen. The phosphor has about a 13% reduction in agglomerate size and about 91 g/min. passes through a 400 mesh screen.

EXAMPLE 5

About 378 g of material which has been wet milled, coated and dried as in Example 4 is dry milled with the addition of about 0.2% Aluminum Oxide C. The resulting material has about a 10.5% reduction in agglomerate size and about 176 g/min. passes through a 400 mesh screen.

EXAMPLE 6

About 378 g of material is treated in the same manner as in Example 5 except that the Aluminum Oxide C content is about 0.3%. The resulting material has about a 6.75% reduction in agglomerate size and about 270 g/min. passes through a 400 mesh screen.

Examples 4, 5, and 6 show that the Aluminum Oxide C further improves handling characteristics with the improvement increasing with the increasing Aluminum Oxide C content.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for creating a rare earth oxysulfide x-ray phosphor comprising:
    (a) wet milling a material comprising a rare earth oxysulfide to deagglomerate said material;
    (b) removing soluble impurities from the resulting deaggomerated material;
    (c) drying the resulting essentially purified material;
    (d) forming a relatively uniform admixture comprising the dried material and aluminum oxide with the aluminum oxide content being from about 0.1 to about 1.0 weight percent of said admixture; and
    (e) heating said admixture at a sufficient temperature for a sufficient time to form said phosphor.

2. A process of claim 1 wherein said aluminum oxide is present in from about 0.3% to about 0.5% by weight of said admixture.

3. A process of claim 1 wherein said aluminum oxide is Aluminum Oxide C.

4. A process of claim 1 wherein said admixture is heated at from about 500° C. to about 600° C.

5. A process of claim 1 comprising the additional step of coating the rare earth oxysulfide with a silicate coating prior to formation of the admixture.

6. A process of claim 5 wherein said silicate coating is selected from the group consisting of magnesium silicate and zinc silicate.

7. A product produced by the process of claim 1.

8. A process for creating a rare earth oxysulfide x-ray phosphor comprising:
    (a) wet milling a material comprising a rare earth oxysulfide to deagglomerate said material;
    (b) removing soluble impurities from the resulting deagglomerated material;
    (c) drying the resulting purified material;
    (d) dry milling the resulting dried material to further deagglomerate the material; and (e) heating the resulting dry milled material at a sufficient temperature for a sufficient time to form said phosphor.

9. A process of claim 8 wherein said dry milled material is heated at from about 500° C. to about 600° C.

10. A process of claim 8 comprising the additional step of coating the rare earth oxysulfide with a silicate coating prior to the dry milling step.

11. A process of claim 10 wherein said silicate coating is selected from the group consisting of magnesium silicate and zinc silicate.

12. A product produced by the process of claim 8.

13. A process for creating a rare earth oxysulfide phosphor comprising:
   (a) wet milling a material comprising a rare earth oxysulfide to deagglomerate said material;
   (b) removing soluble impurities from the resulting deagglomerated material;
   (c) drying the resulting purified material;
   (d) dry milling a mixture comprising the dried material and aluminum oxide with the aluminum oxide content being from about 0.1% to about 1.0% of said mixture; and
   (e) heating the resulting dry milled mixture at a sufficient temperature for a sufficient time to form said phosphor.

14. A process of claim 13 wherein said aluminum oxide is present at from about 0.3 to about 0.5 weight percent of said mixture.

15. A process of claim 14 wherein said aluminum oxide is Aluminum Oxide C.

16. A process of claim 13 wherein said dry milled material is heated at from about 500° C. to about 600° C.

17. A process of claim 13 comprising the additional step of coating the rare earth oxysulfide with a silicate coating prior to the dry milling step.

18. A process of claim 17 wherein said silicate coating is selected from the group consisting of magnesium silicate and zinc silicate.

19. A product produced by the process of claim 13.

* * * * *